April 4, 1944.　　　D. H. GASTON　　　2,345,743
REFRIGERATOR GASKET
Filed March 6, 1941　　　3 Sheets-Sheet 1

Inventor:
Donald H. Gaston
By McCalet & Wendt
Attys

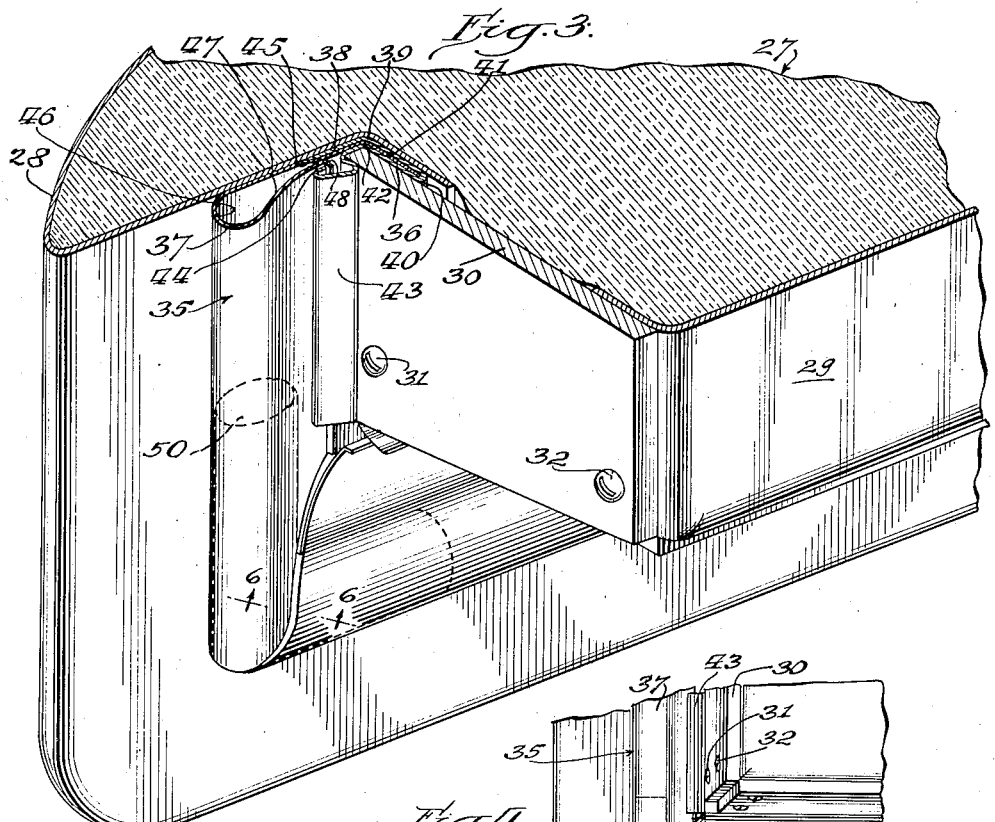
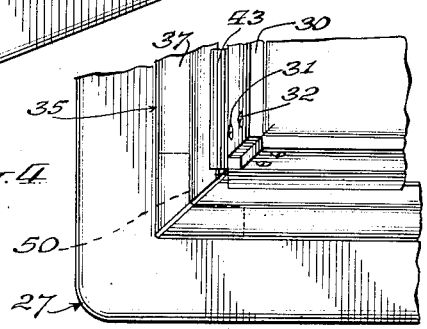
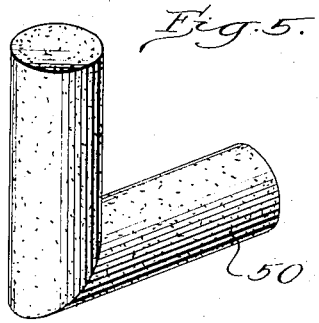
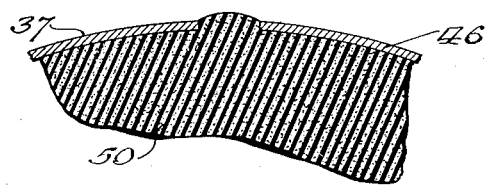

April 4, 1944.  D. H. GASTON  2,345,743
REFRIGERATOR GASKET
Filed March 6, 1941  3 Sheets-Sheet 3
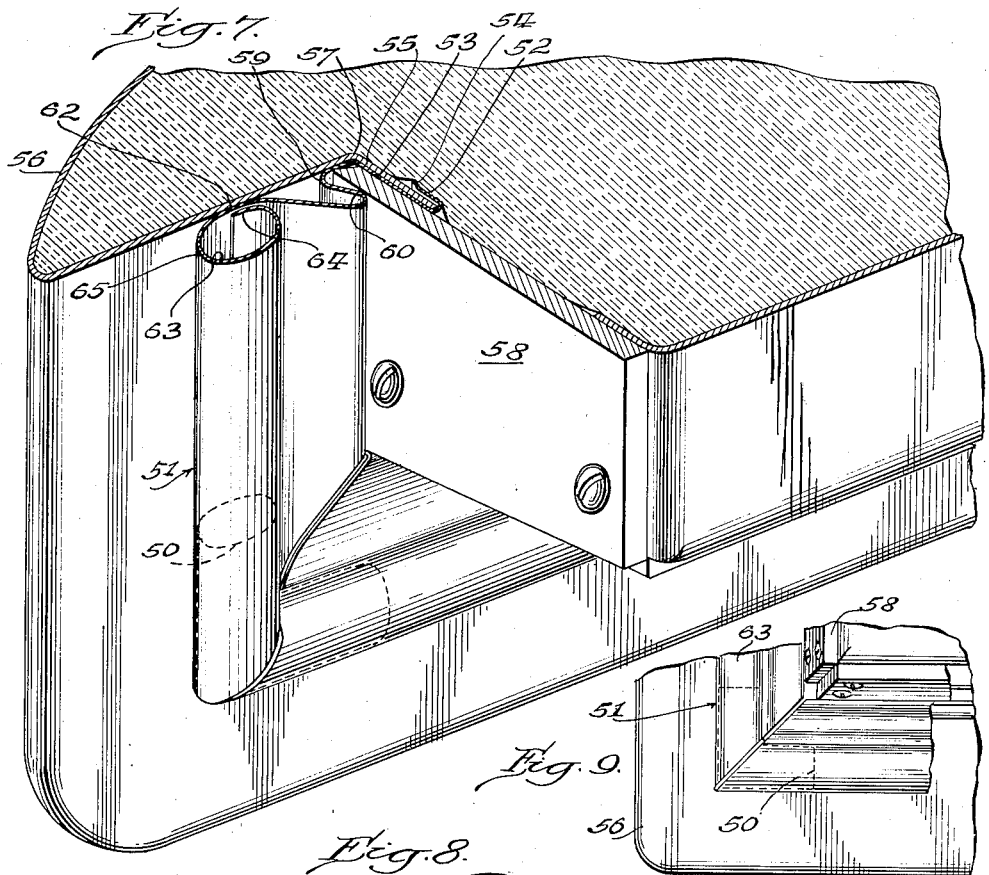
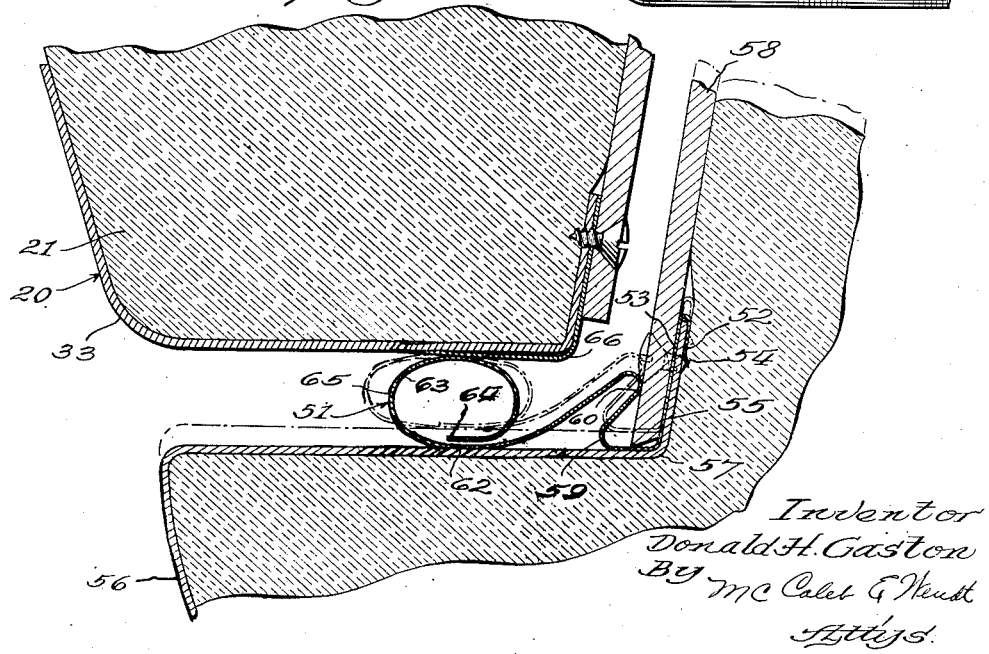
Inventor
Donald H. Gaston
By McCaleb & Wendt
Attys.

Patented Apr. 4, 1944

2,345,743

UNITED STATES PATENT OFFICE 2,345,743

REFRIGERATOR GASKET

Donald H. Gaston, Evansville, Ind., assignor to Sunbeam Electric Manufacturing Company, Evansville, Ind., a corporation of Indiana Application March 6, 1941, Serial No. 381,998

12 Claims. (Cl. 20—69)

The present invention relates to a gasket, and is more particularly concerned with a resilient sheet metal gasket for refrigerator use.

In refrigerator construction, it is desirable that the doors of refrigerators be provided with a gasket seal which will be substantially airtight, and at the same time which will have a maximum resistance to deterioration and a minimum tendency toward the production of odors which might be caused either by characteristics inherent in the material of the gasket itself, or which might be caused by the gasket having crevices or pockets in which food particles or spilled liquid food might lodge.

Since the present day manufacture of refrigerators is on a large scale and by methods which are generally referred to as "continuous production" methods, it is desirable that all parts of the refrigerator shall be adapted to fast continuous production and ease of assembly and, when so manufactured, will be capable of being produced at a reasonable cost.

Gaskets used in the past on refrigerators have usually been fabricated of rubber, either wholly or in part, with the result that after the refrigerator had been in the field for a number of years, the rubber deteriorated and the gaskets had a tendency either to become permanently deformed, and hence lose their sealing characteristics, or in some instances to disintegrate and to have parts of the gasket break off leaving that portion of the door joint completely without gasket protection.

Efforts have been made in the past to use other materials for gaskets, and some attempts have been made to use spring strips somewhat in the nature of weather stripping as a gasket seal for refrigerators. But such attempts in this direction with which applicant is familiar have been unsuccessful due to the fact that such gaskets provided lodging places for food particles and spillage, and, furthermore, were not suited for mounting in a modern refrigerator construction, and had high heat conductivity characteristics.

An object of the present invention is to provide an improved sheet metal gasket for refrigerators.

Another object is to form a sheet metal refrigerator sealing gasket of thin section, resilient, sheet metal and with concealed resilient edges.

Another object is to form a thin resilient strip of sheet metal with rounded contours and concealed flexing edges for mounting as a sealing gasket in a refrigerator door construction, and to seal the joints at the intersections of adjacent gaskets.

Another object is to seal a refrigerator door construction by means of a gasket of thin resilient sheet metal having but one major flexing area, and that of relatively large radius of curvature.

Another object is to seal a refrigerator door joint with a gasket formed of thin section, resilient sheet metal, formed as a roll of relatively large radius, with but one free edge which is concealed within the gasket structure.

Another object is to seal a refrigerator door joint with a gasket having an offset edge recessed between structural members of a refrigerator door and having the gasket formed as a roll positioned at one side of said recess, the gasket being of thin resilient sheet metal having a resiling edge concealed within the gasket structure.

Another object is to provide a refrigerator door gasket having a portion of said gasket of thin resilient sheet metal, convexly curved and positioned to engage a substantially flat striking face to be partially flattened thereby for increased sealing engagement.

Another object is to seal a corner connection between two sheet metal gaskets having each a tubular recess therein by means of a resilient connector insertible in said tubular recesses.

A still further object is a cross-section design for the gasket whereby it may be executed in stainless steel to get the advantages of resistance to corrosion and relatively low heat conductivity as metals go, and yet avoid flexure of such a nature as will crack the stainless steel throughout a long life of continued use despite its objectionable work-hardening characteristic.

Other objects and advantages of the invention will be apparent from the following description and the accompanying drawings, in which similar characters of reference indicate similar parts throughout the several views.

Referring to the drawings, of which there are three sheets:

Fig. 3 is an enlarged fragmentary view in perspective showing the lower corner of a refrigerator door having a door gasket of the type illustrated in Figs. 1 and 2 mounted thereon;

Fig. 4 is an elevational view in reduced scale of the door corner fragment illustrated in Fig. 3;

Fig. 5 is a view in perspective on substantially the same scale as that of Fig. 3, showing a corner sealing member;

Fig. 6 is a fragmentary sectional view as on the line 6—6 of Fig. 3 in greatly enlarged scale, showing the corner sealing gasket of Fig. 5 resiliently sealing the joint between adjacent gaskets;

Fig. 7 is a fragmentary perspective view, similar to Fig. 3, showing a modified form of sheet metal sealing gasket;

Figure 1:
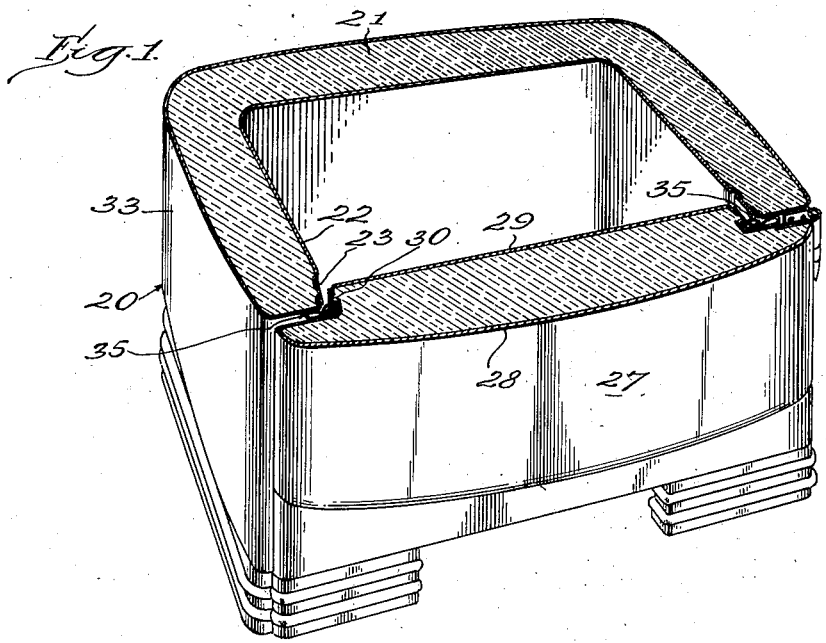
Figure 1 is a fragmentary view in perspective of the lower portion of a refrigerator having a door gasket embodying the present invention, the refrigerator construction being somewhat diagrammatic.
Figure 2:
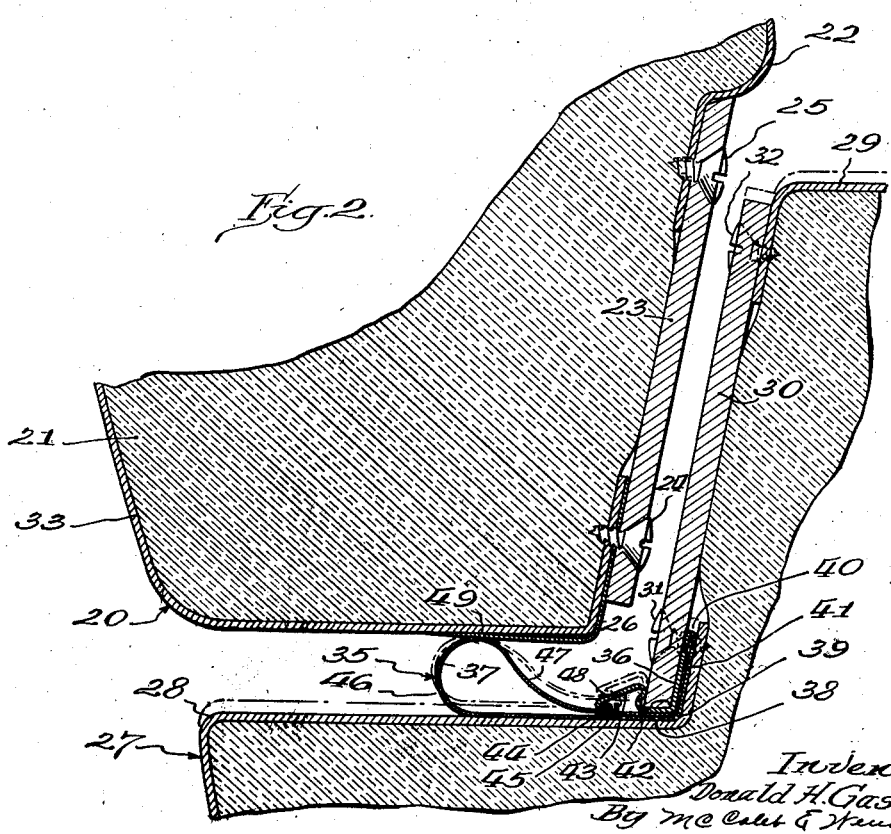
Fig. 2 is an enlarged sectional view of the joint between the cabinet and the door of the refrigerator illustrated in Fig. 1, the parts being shown in solid lines at the time of initial impact of a door gasket embodying the present invention with a striking plate carried by the cabinet, and in dotted lines showing the parts with the door in fully closed position.

Fig. 8 is a fragmentary view, somewhat similar to Fig. 2, showing the modified form of gasket illustrated in Fig. 7, the solid lines illustrating the parts at the moment of impact of the gasket with a striking plate carried by the body of the refrigerator, and the dotted lines showing the parts with the door in fully closed position; and Fig. 9 is an elevational view in reduced scale of the door corner fragment of Fig. 8.

Referring to the embodiment illustrated in Figs. 1 to 4, inclusive, a refrigerator cabinet 20 may be of conventional construction, having an outer wall 33. A sheet metal liner 22 is mounted in a conventional manner in the cabinet and is connected to the outer wall 33 of the cabinet as by means of breaker strips 23 of insulating material, which may be secured to the cabinet wall 33 and to the liner 22 as by means of sheet metal screws 24 and 25, respectively. The space between the cabinet wall 33 and the liner 22 is diagrammatically illustrated as being solidly filled with insulating material 21. A striking plate 26, which is preferably of stainless steel, is inserted between the breaker strip 23 and the cabinet 20 to be gripped by the action of the screws 24 and lies along and forms part of the substantially flat outer face of the outer wall margin about the door opening.

The refrigerator is provided with a conventional door 27 having an outer panel 28 and door liner 29. A substantial marginal portion of the outer panel 28 is turned inwardly to form the substantially flat back face of the relatively thin marginal flange of the door which in the closed position of the door is adapted to lie slightly spaced from the outer margin face of the cabinet at the door opening. The outer door panel 28 forms a thicker central portion for the door and is connected to the liner 29 by means of conventional offsetting breaker strips 30 of insulating material, which lies at an angle approaching the perpendicular to the plane of the marginal door flange and may be connected to the customary attachment flanges of the panel 28 and the liner 29 as by sheet metal screws 31 and 32, respectively.

A sheet metal gasket structure including gasket strips, indicated generally by the numeral 35 in the embodiment illustrated in Figs. 1 to 4, inclusive, constructed and arranged to be mounted upon the back face of the door flange within the angle formed by the door offset to cooperate with the striking plate 26 in providing an effective seal for the closed door. The gasket strips may be of composite or two-part construction, comprising a support portion 36 and a flexing portion 37. Both portions are preferably made of stainless steel strips, the support portion 36 being preferably of heavier stock than the flexing portion 37.

As an example of stock which I have found suitable for use in this construction, the support portion 36 can be of stock approximately twelve-thousandths of an inch in thickness and, since resiliency is not a necessary characteristic of the support portion, a milder grade of stainless steel or other rustproof metal may be employed.

The flexing portion 37, on the other hand, is preferably substantially thinner, and of good resiliency. I have found stock approximately three thousandths of an inch in thickness to be suitable for the flexing portion 37, and at the present time a stainless steel such as that known to the trade as 18-8 is considered suitable for making this portion 37. This steel is of good resiliency, within the small limits of bending required by the design of the present gasket, is capable of being formed to the shape illustrated in Fig. 2, and is not affected by any of the ordinary foods, cleansing materials, acids, or alkalies which the strip may be expected to encounter in its normal use.

Since constant research work is being performed to improve metals, I do not intend to limit the invention to the use of any particular grade of metal, but may use any metal having the proper characteristics as above set forth.

It is well known to those familiar with the characteristics of stainless steel that this metal has a tendency to become hard and brittle under continued bending. Such characteristic is generally referred to as "work hardening." Due to this inherent feature of stainless steel it has been impractical to use this metal in any of the known types of weather strips or metal sealing members of the prior art.

For convenience in mounting the gasket strips 35, the support portion 36 and the flexing portion 37 are interengaged as a unit and the support portion is shaped to provide a longitudinal channel within which the edge of the associated breaker strip 30 is adapted to fit. To this end, the support portion 36 comprises an originally flat body 38 closely folded upon itself along a longitudinal line of bending 40 to form a socket within which a marginal flange section 41 of the thinner flexing strip 37 is tightly gripped. The inner and outer socket legs of the body strip 38 are bent angularly intermediate their edges along longitudinal lines 39 and 42, respectively, to conform to the angle between the breaker strip 30 and the adjoining back face of the door flange. The flange section 41 is, of course, also bent to conform to the angle of its socket and is thereby interlocked within the socket against lateral withdrawal.

The fold leg of the angular support portion 36 is secured in place between the breaker strip 30 and the opposing attachment flange of the door panel 28, while the remaining or free edge leg extends out beyond the edge of the breaker strip to a limited extent in contact along the back marginal face of the door. The inner panel of the free edge leg lies flat against the contiguous door face, but the exposed panel is fashioned to form together with the fold leg a channel equal to the thickness of the breaker strip 30 which has its edge engaged in the channel, as shown. The exposed panel wall of the channel is preferably ogee curved for snug resilient engagement with the breaker strip margin. The remainder of the exposed panel then extends generally obliquely from the edge of the channel toward the plane of the inner panel to form an arched marginal housing 43 and has an inturned narrow marginal flange 44 lying parallel to and in a slightly spaced plane from the inner panel.

Adjacent the edge of the inner free leg panel of the support portion 36, the body of the flexing portion 37 is offset, as at 45, equal to the thickness of such leg to extend for a substantial distance therebeyond in parallel contact with that rear marginal face area of the door which lies opposite the striking plate 26 when the door is closed. Then, to provide the actual sealing member of the gasket, the flexing strip 37 is turned upon itself to form a roll 46 of generous curvature and generally elongated shape in cross section, presenting a broad side as an arcuate striking surface 49 directly to the outer marginal face at the door opening for interengagement with the striking plate 26. The free marginal remainder 47 of the flexing portion extends on a shallow in-curve from the striking surface curvature 49 to bring the free edge of the roll into concealed relation within the arched housing 43. Within the housing, the free edge portion is received slidably between the housing flange 44 and the opposing body of the flexing strip 37 inwardly of the offset 45. At its inner edge the free margin 47 is bent at right angles to form a stop flange 48 opposing the edge of the housing flange 44 which thus serves as a keeper engageable by the stop flange to prevent the free margin from being withdrawn from the housing but permitting free inward movement of the margin.

In the normal position of the flexing portion 37 of the gasket 35, which is the position assumed by the gasket 35 when the refrigerator door 27 is open, or in the solid-line position illustrated in Fig. 2, the flange 48 lies closely adjacent to the inturned housing flange 44 of the supporting portion 36. When the door is moved to a closed position, as indicated in dotted lines in Fig. 2, the roll 46 of the gasket strikes the plate 26 and is slightly compressed or flattened. When the gasket is so compressed, the arc of curvature at the outer striking surface side 49 of the roll portion 46 will be sprung to have a somewhat reduced radius, while the convexity of the striking surface will be decreased, or, in other words, the radius of curvature will be increased. The distance from the point of impact at the striking surface 49 to the edge of the flange 44 will be decreased upon a movement of the door 27 from the solid to the dotted line positions of Fig. 2, so that during such movement the free edge of the flexing portion 37, which carries the flange 48, will be moved slidably inward, as indicated in dotted lines in Fig. 2, thereby permitting a free flexing of the roll portion 46 of the gasket during compression.

In order to insure proper sealing of the corners of the gaskets, a resilient corner filler member 50 (see Figs. 3, 4 and 5) is provided which is made of sponge rubber and is of rod-like section and elbow shaped to conform to the interior opening of the roll portion 46 of the gasket to be insertable therein. The ends of the gasket strips where they join at the corners of the door flange are mitered and are fitted together with sufficient clearance to prevent binding, in normal practice about one-sixteenth of an inch. The corner filler member 50, being of sponge rubber, does not interfere with the flexing of the gaskets, but does insure that the joined end portions of each gasket are more firmly pressed into sealing contact with the striking plate 26. The rubber corner fillers also serve to seal the crack at the miter against heat loss and air leakage as well as to seal these cracks against the entrance of dirt or spilled foods.

In the modified form of the invention illustrated in Figs. 7, 8 and 9, a gasket 51 is preferably formed from a single strip of material such as, for instance, stainless steel. In this modified construction, it is necessary that the material from which the gasket is made shall have the characteristics mentioned for the resilient portion of the form illustrated in Figs. 1 to 4, inclusive. Stainless steel strip of the type known as 18-8 and three-thousandths of an inch in thickness has been found suitable for this purpose.

The gasket 51 is formed to the cross-sectional shape illustrated in Fig. 8. A flange 52 is formed by reversely bending the edge of a flat portion 53 of the gasket, the free edge of the flange 52 being bent outwardly, as at 54, to serve as a guide in inserting a flange 55 of a door panel 56 into the space between the portion 53 and the flange 52.

The strip forming the gasket is bent outwardly at 57 to lie in contact with the door panel 56 for a distance somewhat greater than the thickness of a breaker strip 58. The gasket is then sharply curved, as at 59, back toward the breaker strip, as at 60, resiliently to grip the breaker strip between the portion 53 and the point 60.

From the point 60, the strip forming the gasket is reversely bent on a small-radius, nearly 180° bend to contact the inner face of the door panel 56 at 62. From this point the strip is curved into an oval roll 63 of generous curvature, the free end 64 of the oval being concealed within the curved body thereof. The free end 64 is spaced slightly from the strip at the point 62, so as to permit an initial flexing of the outer or exposed edge 65 of the roll 63 before the free edge 64 contacts the portion 62. This permits a free flexing of the roll throughout the outer portion 65 of the roll during a portion of the compression of the roll, and at the same time brings the edge 64 into close sealing engagement with the portion 62 in the fully closed position of the door.

Upon engagement of the free edge 64 with the portion 62, the roll 63 is completely closed, and the slight movement of the door beyond the point of engagement of the free edge 64 with the portion 62 causes a slight flattening of the roll in the direction of its minor axis. This tends to cause a slight flattening of the roll at its line of contact with a striking plate 66 and increases the sealing effect of the gasket.

The closing of the roll as above set forth traps the air within the gasket and when the door is fully closed, this trapped air provides a dead air space which assists in insulating the gasket against heat transfer.

Corner fillers similar to the sponge rubber member 50 illustrated in Fig. 5 are preferably inserted in the gaskets at each mitered corner thereof to seal the mitered corners and to provide additional resilient pressure at each corner of the gasket which assists in securing a tight gasketed seal.

Although stainless steel is a poorer heat conductor than many other metals, it is nevertheless a fairly good conductor. However, the design of the present gasket is such that the extremely thin metal of the gasket is disposed in the direction of heat travel, in contact with the surfaces of the door flange and of the cabinet as is clearly illustrated in Figs. 2 and 8, so that a highly efficient thermal seal is thus obtained, and one which is not subject to rotting, rusting, or deterioration.

The gasket is easily formed either on roll-forming machines or in brake presses, and can be readily applied to any standard refrigerator door construction. When applied as illustrated, the gasket is held in place by the same screws which hold the breaker strips in place so as to lend itself particularly well to fast, simple and durable construction.

While I have illustrated certain preferred embodiments of my invention, many modifications may be made without departing from the spirit of my invention, and I do not wish to be limited to the precise details of construction set forth but desire to avail myself of all changes within the scope of the appended claims.

Having thus described my invention, what I claim and desire to secure by Letters Patent of the United States is:

1. A refrigerator door gasket for a refrigerator cabinet having a door opening therein and having a hinged refrigerator door, said door having an outer panel, the marginal portion of which is adapted to lie in proximity to the cabinet around the door opening, said door having a lining panel adapted to enter the door opening when the refrigerator door is in a closed position, and said door panel and said door liner being connected by breaker strips of insulating material positioned around the marginal edge of said liner, the gasket being of thin springy sheet metal having a channeled mounting portion mounted to receive an edge of a door breaker strip therein to secure said gasket in mounted position, said gasket having a resilient roll portion of generous curvature, positioned to lie adjacent an inner face of said marginal door portion, the roll portion having one margin thereof affixed to the channeled mounting portion to be substantially co-extensive therewith, the roll portion having the other margin thereof free for limited shifting movement, said other margin being curved to extend inside of a gasket portion, the roll portion being thicker than the closed distance between the marginal portion of the outer door panel and the face of the cabinet around the door opening, to compress the roll portion of the gasket on closing the refrigerator door.

2. A refrigerator door gasket for a refrigerator door having a breaker strip of insulating material around a central door area, the gasket being of thin springy sheet metal having a rigid channel mounting portion, and having an integral rolled compressible portion, the channel portion being adapted to receive an edge of a door breaker strip therein, one side of the channel being adapted to be gripped between such breaker strip and a door element, the gasket being bent from the opposite edge of said channel toward the door and thence in a roll of generous curvature to bring an edge of said gasket within and beneath a portion of said gasket to be concealed by said gasket portion, the concealed edge being free for limited shifting movement upon a compression of the gasket roll.

3. A refrigerator door gasket for a refrigerator door having a thicker central portion and a thinner marginal flange portion, and a breaker strip of insulating material surrounding the thicker central portion, the gasket being of thin springy sheet metal having a relatively rigid channel mounting portion, and having an integral rolled resilient portion, the channel portion being adapted to receive an edge of a door breaker strip therein, one side of the channel being gripped between such breaker strip and a door element, the gasket being bent from the opposite edge of said channel toward the door flange and thence in a roll of generous curvature to conceal an edge of said gasket within and beneath said roll, the concealed edge normally being spaced slightly from an opposite inner side of the roll for freedom for limited shifting movement and so positioned as to be moved by a compression of the roll into sealing contact with an opposite inner side of said roll.

4. A gasket for a refrigerator door having a thicker central portion, and a thinner marginal flange with an offset between the central portion and the flange, and a breaker strip mounted on the face of the offset at an angle approaching the perpendicular from the plane of the flange, said gasket comprising a strip of thin springy sheet metal having a channeled mounting portion formed to receive an edge of a door breaker strip therein, and having a laterally projecting portion bent into a roll of generous curvature to lie along the inner face of a refrigerator door flange, a free margin of said roll portion being curved to extend beneath a protective gasket portion.

5. A gasket for a refrigerator door having a thicker central portion, and a thinner marginal flange with an offset between the central portion and the flange, and a breaker strip mounted on the face of the offset at an angle approaching the perpendicular to the plane of the flange, said gasket comprising a strip of thin springy sheet metal, a second strip of metal folded to grip an edge portion of said first strip between the folded portions of said second strip, one margin of the second strip being arched to form an edge housing for the first strip, both folded portions of the second strip, and the included first strip, being bent along a line located between the arched margin and the line of fold of the second strip at an angle substantially equal to the angle between the breaker strip and the door flange, the first strip projecting beyond the arched margin of the second strip and being formed into a roll of generous curvature, a free edge of said roll being curved to extend into concealed relation within the arched margin of the second strip to be free for limited shifting movement therein.

6. A gasket for a refrigerator door having a thicker central portion, and a thinner marginal flange with an offset between the central portion and the flange, and a breaker strip mounted on the face of the offset at an angle approaching the perpendicular from the plane of the flange, said gasket comprising a strip of thin springy sheet metal, a second strip of metal folded to grip an edge portion of said first strip between the folded portions of said second strip, one margin of the second strip being arched to form an edge housing for the first strip, both folded portions of the second strip, and the included first strip, being bent along a line located between the arched margin and the line of fold of the second strip at an angle substantially equal to the angle between the breaker strip and the door flange, the first strip projecting beyond the arched margin of the second strip and being formed into a roll of generous curvature, a margin of said first strip comprising said roll being curved to position a free edge thereof within the arched margin of the second strip to be free for limited shifting movement therein, the free edge of the first strip having a flange formed thereon to engage the arched margin of the second strip to prevent withdrawal of the free edge from beneath the arched margin.

7. A gasket for a refrigerator door wherein a door face is spaced slightly from a cabinet face in a closed position of the door, the gasket being formed of a strip of thin springy sheet metal having a margin thereof shaped to conform with a door structure for mounting thereon to overlie such door face, a companion strip having one margin bent to provide an edge housing, and a portion of the first-mentioned strip laterally beyond the housing being bent into a roll to seal the space between said faces when the door is closed, a free edge of the roll portion extending into the edge housing to be free for guided shifting movement therein on compression of said roll.

8. A refrigerator door gasket for a refrigerator door, having a breaker strip of insulating material around a central door area, the gasket being of thin springy sheet metal, having a rigid channel mounting portion adapted to receive an edge of a door breaker strip therein, one side of the channel being gripped between said breaker strip and a door element, the gasket material extending from said channel along the door and thence in a roll of generous curvature, a free edge portion of said gasket extending laterally beyond said roll portion adjacent to said channel, and a housing carried by said channel and overlying said free edge portion, said housing being spaced from said door to admit said edge portion for free slidable movement within said housing.

9. A gasket to be mounted on and along the back margin of a refrigerator door in sealing relation between the back face of the door and the outer face of the margin of its door opening, the gasket being of thin springy sheet metal and comprising in cross section an elongated roll of generous curvature, presenting an arcuate striking surface directly to the door opening margin, one margin of the sheet metal terminating in a shiftable concealed edge, and the other margin extending as an attaching flange tangentially from the roll to lie alongside the back face of the door, a second similar gasket connected to said gasket at a corner of a refrigerator door by a miter joint, said gaskets being spaced slightly from each other along said miter joint, and a soft resilient elbow, the legs of which are inserted in and compressed slightly by the respective ends of the adjoining roll portions of said gaskets of said miter joint, the elbow between said respective ends projecting slightly above a plane defined by the top edges of said roll portions to increase the resilient compressive characteristics of said gasket ends adjacent said miter joint and to seal the space between said gasket ends at said miter joint.

10. A gasket assembly for a refrigerator door, comprising a pair of resilient gasket members, each of said resilient gasket members comprising an attaching flange portion, a relatively wide body portion, and a curved sealing portion having a relatively large easy bend for engagement with a door flange and a facing surface on a refrigerator adjacent a door opening, said members being spaced from each other to form a joint, and a resilient member of live resilient compressible material of substantially complementary shape to said sealing portion and compressed to fit in said sealing portions, said resilient member projecting beyond said gasket members to effect a seal at the joint between said gasket members without said gasket members coming into engagement with each other.

11. A gasket assembly for a refrigerator door, comprising a pair of resilient gasket members, each of said resilient gasket members comprising an attaching flange portion, a relatively wide body portion, and a curved sealing portion having a relatively large easy bend for engagement with a door flange and a facing surface on a refrigerator adjacent a door opening, said members being spaced from each other to form a joint, and a resilient member of live resilient compressible material of substantially complementary shape to said sealing portion and compressed to fit in said sealing portions, said resilient member projecting beyond said gasket members to effect a seal at the joint between said gasket members without said gasket members coming into engagement with each other, said gasket members having their end portions at said joint mitered to permit the location of the gasket members at an angle, and said resilient member having a corresponding angular bend.

12. In a gasket for refrigerators, the combination of a supporting member of sheet metal having a pair of clamping flanges and having a pair of housing flanges, with a sealing member comprising a relatively thin resilient sheet metal strip having a securing portion adapted to be received between said clamping flanges of said first-mentioned member, and having a relatively wide body flange, and said sealing member having a sealing portion with a large easy bend, the free edge of said sealing portion extending into the housing flanges of said first-mentioned member.

DONALD H. GASTON.